United States Patent [19]

Siol et al.

[11] Patent Number: 5,530,080
[45] Date of Patent: Jun. 25, 1996

[54] POLYMETHACRYLATE MOLDING COMPOUND WITH HIGH HEAT DEFLECTION TEMPERATURE AND STABILITY AGAINST THERMAL DEGRADATION

[75] Inventors: Werner Siol, Darmstadt; Michael Wicker, Seeheim-Jugenheim; Klaus Koralewski, Reidstadt; Ulrich Terbrack, Reinheim, all of Germany

[73] Assignee: Roehm GmbH Chemische Fabrik, Darmstadt, Germany

[21] Appl. No.: 353,224

[22] Filed: Dec. 1, 1994

[30]  Foreign Application Priority Data

Dec. 1, 1993 [DE] Germany ............... 43 40 887.7

[51] Int. Cl.⁶ ............... C08F 20/14; C08F 2/42
[52] U.S. Cl. ............... 526/224; 526/82; 526/85; 526/329.7
[58] Field of Search ............... 526/329.7, 86, 526/224, 85

[56]          References Cited

U.S. PATENT DOCUMENTS

| | | |
|---|---|---|
| 2,974,125 | 3/1961 | Lang et al. . |
| 3,637,545 | 1/1972 | Fivel . |
| 3,775,364 | 11/1973 | Duggins ............... 526/329.7 |
| 4,214,064 | 7/1980 | Kanazawa ............... 526/193 |
| 4,328,329 | 5/1982 | Novak ............... 526/218 |
| 4,605,717 | 8/1986 | Heitner ............... 526/228 |
| 4,650,821 | 3/1987 | Leonard ............... 524/127 |
| 4,711,938 | 12/1987 | Suka et al. . |
| 4,728,701 | 3/1988 | Jarvis ............... 526/65 |
| 5,151,482 | 9/1992 | Ikeda ............... 526/329.7 |
| 5,324,802 | 6/1994 | Krieg ............... 526/218.1 |
| B14,550,136 | 6/1987 | Hoscio ............... 524/718 |

FOREIGN PATENT DOCUMENTS

| | | |
|---|---|---|
| 0245647 | of 0000 | European Pat. Off. . |
| 0319622 | 6/1989 | European Pat. Off. . |
| 1645232 | 10/1970 | Germany . |
| 2504417 | 8/1975 | Germany . |
| 4-146903 | 5/1992 | Japan . |
| 1490859 | 11/1977 | United Kingdom . |

*Primary Examiner*—Fred Zitomer
*Attorney, Agent, or Firm*—Oblon, Spivak, McClelland, Maier & Neustadt

[57]          ABSTRACT

The invention relates to a polymerization process for the production of polymethacrylate molding compounds having high heat deflection temperature and high stability against thermal degradation, are prepared by polymerizing methacrylate monomer in a reaction medium such that at least 70 wt. % of the polymethacrylate molding compound is produced at a monomer concentration in the reaction medium of at least 5 mol per liter.

14 Claims, No Drawings

POLYMETHACRYLATE MOLDING COMPOUND WITH HIGH HEAT DEFLECTION TEMPERATURE AND STABILITY AGAINST THERMAL DEGRADATION

BACKGROUND OF THE INVENTION

1. Field of the Invention

The invention relates to a process for the production of polymethacrylate molding compounds having high heat deflection temperature and high stability against thermal degradation, whereby at least 70% of the molding compound is produced with a monomer concentration of more than 5 mol methacrylate per liter of reaction mixture.

2. Description of the Background

Polyethacrylate molding compounds are usually produced by discontinuous or continuous bulk polymerization and by bead polymerization. The discontinuous process, performed at low temperatures, e.g. between 20° and 50° C. is very time and work intensive. For this reason it has more recently been almost completely replaced with continuous, but technologically complex polymerization processes.

The continuous methacrylate polymerization is performed e.g. in a zone of rising temperatures from 130° to 250° C. in a polymerization unit constructed as an extruder. Prior to the isolation of the polymer as an extrudate, unreacted monomer having a content of up to 40 wt. % of the batch monomer, is removed in a degasification zone and is returned to the polymerization zone. During polymerization, high space-time yields can be attained only by performing the polymerization at temperatures of approximately 100° C. and in the presence of relatively high initiator concentrations (cf. e.g. Vieweg, Esser, Kunststoff-Handbuch, Vol. IX, pp. 22 to 35, Carl Hanser Verlag, Munich, 1975, or Ullmanns Enzyklopädie der technischen Chemie, 4th ed., Vol. 19, pp. 22–27, Verlag Chemie, Weinheim, 1980). Also known is the production of polymethacrylate molding compounds by solvent polymerization and subsequent evaporation of the solvent.

To stabilize against the thermal degradation of polymethacrylate molding compounds, the methacrylate is generally copolymerized with a few percentages of an acrylate or with styrene.

The polymerization processes for producing polymethacrylate molding compounds, which can be processed thermoplastically, are generally performed in the presence of chain transfer agents, particularly in the presence of mercaptans which interfere with the polymerization mechanisms as chain stoppers and thus influence the degree of polymerization and the chemical structure of the polymer end groups. Using mercaptans as the best known chain transfer agents, this generally results in polymers having a higher number of thermally more stable end groups than polymethacrylates produced without chain transfer agents (DE-PS 16 45 232). The nature of the end group is of particular significance for the thermal stability of polymethacrylate molding compounds. It was e.g. possible to demonstrate in model experiments that polymethacrylate polymer chains with saturated end groups, such as are formed by transfer, are stable up to temperatures above 300° C., while polymer chains formed by disproportionation termination, and thus have an olefinic double bond at the chain end, already undergo thermal degradation at approximately 250° C. [P. Cacioli et al., Polymer Bulletin 11, 325 (1984)]. Particularly unstable are polymethylmethacrylate (PMMA) polymer chains produced by recombination termination; these are thermally stable only up to a temperature of 190° C.

To attain a satisfactory thermal stabilization, it is advantageous that the incorporation of acrylates and the polymerization in the presence of mercaptans are combined in the technical production processes of polymethacrylate molding compounds. Further, additional low molecular stabilizers are added in order to improve processability.

The heat deflection temperature of polymethacrylate molding compounds, which may be defined e.g. by the glass transition temperature ($T_g$) or the Vicat softening temperature VST according to DIN 53460, is influenced significantly by the tacticity of the polymethacrylate polymer chains which can be varied widely depending on the polymerization process. A high content of syndiotactic and heterotactic triads, which results in molding compounds with a high heat deflection temperature, in addition to a low content of isotactic triads in the polymer chains, are technically desirable. Such tacticities are attained with low polymerization temperatures. Relatively high initiator concentrations must be used in such polymerization processes in order to attain high space-time yields. This results to a greater degree in polymer chains which, as already explained, are terminated by termination due to recombination termination or disproportionation termination and thus assumedly result in lower thermostability. On the other hand, polymerization at higher temperatures, e.g. in a continuous polymerization process at approximately 180° C., results in polymers with good stability against thermal degradation in a good space-time yield using only a relatively small amount of initiator. Because of the high polymerization temperature, the higher temperature polymerization produces however, as a result of the high isotactic triad content, a polymer with a low heat deflection temperature. EP-PS 0 245 647 (=U.S. Pat. No. 4,877,853) provides a technical concept for overcoming this dilemma. Here a thermoplastically processable polymethacrylate molding compound with high heat deflection temperature and high stability against thermal degradation is described. The polymethacrylate has a content of more than 60% syndiotactic triads, and preferably an initiator-chain transfer agent ratio of less than 1:2. The polymethacrylate molding compound is produced at temperatures between 0° and 100° C. by emulsion polymerization.

Continuous polymerization processes performed with lower yields and high polymerization temperatures with good space-time yields are disclosed e.g. in Japanese Kokai Tokyo Koho JP 04,146,903, which describes the polymerization of methylmethacrylate (MMA) at yields up to 20 to 50%. The subsequent monomer degasification, as well as the final polymerization of the polymer syrup into PMMA results in polymer plates with good optical properties.

U.S. Pat. No. 2,974,125 discloses the production of copolymers from MMA, styrene and acrylonitrile by a polymerization which is performed at temperatures between 130° and 155° C. and with yields up to 10 to 50%. The unreacted monomers preferably are removed by degasification, and the resulting polymers are characterized by high strain at break values. DE-AS 25 04 417 describes a process for producing methylmethacrylate polymers containing at least 80 wt. % MMA units. In this process the monomers are reacted at temperatures between 150° and 180° C. until reaching a conversion of 50 to 80% in the stirred tank reactor, and the unreacted monomers are removed by applying a vacuum. The resulting polymers are free of residual monomers and oligomers up to a molecular weight of 1,000 Dalton.

U.S. Pat. No. 4,711,938 discloses a continuous process for producing PMMA or MMA-containing copolymers at polymerization temperatures from 140° to 170° C. and conversions of up to 50%. Residual monomers are also removed by the application of a vacuum. The resulting polymers are characterized by high optical purity and narrow molecular weight distribution. U.S. Pat. No. 3,637,545 describes the production of polymethylmethacrylate by way of continuous mass polymerization at temperatures between 145° and 165° C. and conversions between 40 and 60%.

The residual monomers were again removed by degasification. According to another embodiment of the invention elastomer particles may be present during the reaction.

EP Patent 0 319 622 B1 describes a process for the continuous solvent polymerization of (meth)acrylates by (a) adding monomers, polymerization aids and solvents in such a way that the polymer content of the reaction mixture remains below 50 wt. %, (b) conducting the reaction at temperatures of 60° to 130° C. and adequate residence times to ensure a 20 to 95% conversion of the monomers, (c) transferring the polymer into a different polymerization reactor for (d) subsequently polymerizing at reaction temperatures between 60° and 130° C., (e) transferring of the raw polymer produced in step (d) to a final polymerization reactor where the non-polymerized components of the reaction mixture are removed by flash degasification, and (f) specially finishing the final polymer.

Except for the concept described in EP-PS 0 245 647, the applications or patents described above do not offer an approach for solving the problem of how PMMA molding compounds can be produced which possess both a high heat deflection temperature, and thus a low content of isotactic triads, as well as a high stability against thermal degradation due to special end groups in the polymer chains. EP-PS 0 245 647 solves the problem of producing PMMA molding compounds with high heat deflection temperature and high stability against thermal degradation excellently. Since the molding compounds described in the patent are produced by emulsion polymerization, the isolation of such molding compounds from the aqueous dispersion is technically complex. A need, therefore, continues to exist for a technically less complex method of producing polymethacrylate molding compounds having high heat deflection temperature and high stability against thermal degradation.

SUMMARY OF THE INVENTION

Accordingly, one object of the present invention is to provide a relatively simple polymerization technique of producing polymethacrylate molding compounds of high heat deflection temperature and high stability against thermal degradation.

Briefly, this object and other objects of the present invention as hereinafter will become more readily apparent can be attained in a method of producing polymethacrylate molding compounds having high heat deflection temperature and high stability against thermal degradation by polymerizing methacrylate monomers in a reaction mixture in reactors in which a high degree of intermixing is ensured, the polymerization being terminated after a defined conversion is reached, and then removing the unreacted monomers from the reaction mixture, the improvement comprising conducting polymerization such that at least 70 wt. % of the polymethacrylate molding compound is produced at a methacrylate monomer concentration of more than 5 mol/liter in the reaction mixture. In a preferred embodiment, the polymerization is performed discontinuously, e.g. in a stirred tank reactor operated in a batch mode. The polymerization temperatures are preferably between 30° and 120° C., particularly between 60° and 100° C.

In another embodiment of the invention, the content of the polymerization initiators is below 0.05 wt. %, relative to the starting materials, particularly below 0.02 wt. %. The content of the molecular weight regulator is preferably 0.1 to 2 wt. %, based on the starting materials, particularly 0.2 to 1 wt. %. After completion of the polymerization of the monomers, which preferably contain more than 75 wt. % methylmethacrylate (MMA), and in particular more than 95 wt. % MMA, the remaining monomers are removed preferably by degasification in an extruder. The resulting polymethacrylate polymers have clearly higher heat deflection temperatures and higher stabilities against thermal degradation than polymethacrylate polymers produced in the presence of lower monomer concentrations.

DETAILED DESCRIPTION OF THE PREFERRED EMBODIMENTS

The process of the present invention can be performed discontinuously in reactors equipped with a stirring aggregate., e.g. stirred tank reactors with blade, anchor, disk or impeller agitators (cf. e.g.: Kirk-Othmer, Encyclopedia of Chemical Technology, Vol. 19, pp. 880 to 914, John Wiley & Sons, New York, 1982). Continuous reactors, such as tubular flow reactors, preferably with turbulent flow, or screw conveyor aggregates, preferably double screw extruders with a narrow dwelling time spectrum, can also be used. It is preferred that discontinuous stirred tank reactors, in which the agitator aggregates ensure a high degree of intermixing, are used.

The unreacted monomers can be removed from the reaction mixture by vacuum degasification processes, such as e.g. flash degasification by way of a discontinuous vacuum application, film boiling, or preferably by degasification in an extruder with applied vacuum. Polymethacrylate molding compounds are understood to be compounds which are made up of more than 75 wt. % methylmethacrylate, particularly with more than 95 wt. % and preferably with 98 to 100 wt. % methylmethacrylate as monomer component. It is also possible that comonomers, such as acrylates, preferably with $C_1$–$C_8$ alkyl in the ester residue, (meth)acrylonitrile, (meth)acrylic amides, styrene or substituted styrenes, vinyl esters or vinyl amides, maleic acid or its derivatives, as well as possibly other copolymerizable monomers are present in the polymerization medium (cf. e.g. H. Rauch-Puntigam, Th. Vöker, Acryl- und Methacrylverbindungen, Springer, Heidelberg, 1967).

THE POLYMERIZATION PROCESS

The polymerization initiators used are those commonly used for the polymerization of methacrylates, e.g. azo compounds, such as azodiisobutyronitrile, as well as peroxides, such as dibenzoyl peroxide or dilauroyl peroxide or other peroxide compounds such as e.g. t-butylperoctanoate, or perketals, as well as redox initiators (cf. e.g. H. Rauch-Puntigam, Th. Völker, Acryl- und Methacrylverbindungen, Springer, Heidelberg, 1967, or Kirk-Othmer, Encyclopedia of Chemical Technology, Vol. 1, pp. 286 ff, John Wiley & Sons, New York, 1978). It is preferred that the polymerization initiators should be used in amounts from $10^{-4}$ to 0.1 wt. % relative to the starting materials, particularly in amounts of $2 \times 10^{-4}$ to 0.05 wt. %, and very particularly in amounts from $10^{-3}$ to 0.02 wt. %.

Molecular weight regulators and chain transfer agents are also commonly used, especially R-SH mercaptans, whereby R may stand for a cyclic or branched alkyl group with 2 to 20 carbon atoms such as n-butylmercaptan, tert.-dodecylmercaptan, esters of thioglycolic acid, or polyfunctional mercaptans with 2 to 6 SH groups, preferably in amounts from 0.05 to 5 wt. % relative to the starting materials (cf. H. Rauch-Puntigam, Th. Völker, Acryl- und Methacrylverbindungen, Springer, Heidelberg, 1967). Particularly preferred are amounts from 0.1 to 2 wt. %, especially amounts from 0.2 to 1 wt. %. It is also possible to use halogen-containing compounds such as e.g. $CCl_4$ or benzyl bromide to regulate the molecular weight. But the use of regulators of the type R-SH or R'-H, wherein R' stands for alkyl, cycloalkyl, or aralkyl with 5 to 30 carbon atoms, e.g. cumene, and which are able to terminate the growing polymer chain with an H atom is preferred.

The polymerization process of the present invention starts with pure monomers or the monomer mixtures which, in addition to polymerization initiators and the molecular weight regulators possibly may also contain other additives, such as e.g. release agents, dyes or opacifiers in amounts up to 10 wt. %, preferably in amounts up to 5 wt. % based on the monomers used.

The reaction is controlled so that the final product of the polymerization consists of at least 70 wt. % of a polymer produced in the presence of a monomer concentration of at least 5 mol monomer per liter reaction mixture.

Polymerization processes in the presence of solvents in which the local monomer concentration is reduced must be avoided. In the case of a completely homogeneous reaction mixture the conversion of methacrylate monomers into polymethacrylate polymer that can be reached in the process of the invention is a maximum of 55%, preferably a maximum of 50%. Particularly well suited for the instant polymerization process for polymethacrylate molding compounds are stirred tank reactors with intensive intermixing. The polymerization temperatures, which must be coordinated with the selection of polymerization initiators, preferably range between 30° and 120° C. particularly between 60° and 100° C. The reaction mixture is heated to the polymerization temperature using common methods of heat input into reactors, e.g. by pressurized steam heat exchangers and/or the released polymerization enthalpy.

After reaching the maximum conversion, the reaction is terminated. This may be accomplished e.g. by rapid removal of the unreacted monomer, e.g. by vacuum degasification in the reactor, film boiling in a thin film evaporator, or by degasifying extrusion of the reaction mixture. It is preferred that prior to the removal of the unreacted monomer, polymerization inhibitors that terminate the growth of the polymer chains are added in amounts of up to 1 wt. % based on the reaction mixture. Suitable examples of the polymerization inhibitors include sterically hindered amines, aminoxyl radicals and phenols, phosphites, sulfides with two organic substituents or metal salts of dithio acids (cf. also Kirk-Othmer, Encyclopedia of Chemical Technology, Vol. 3, pp. 130 ff, John Wiley & Sons, New York, 1978). Another suitable polymerization inhibitor is oxygen.

The unreacted monomer(s) are removed after the reaction in the manner already described above. The preferred process for this is a vacuum degasification of the reaction mixture by extrusion, preferably in a single- or double-screw extruder equipped with a vacuum zone. In a preferred embodiment of the invention, the reaction mixture of polymethacrylate polymer and unreacted monomers is removed continuously with the extruder from the stirred tank reactor after the reaction is complete. Also preferred is the semi-continuous production of the polymethacrylate molding compound by way of consecutive polymerization in several stirred tank reactors. It is particularly preferred that buffer vessels, e.g. holding tanks, be used in order to ensure a continuous operation of the degasification extruder.

If the reaction mixture cools down extensively prior to being fed into the degasification extruder, e.g. to room temperature or lower temperatures, this necessitates an addition of up to 25 wt. %, based on the reaction mixture, of solvents such as e.g. methylmethacrylate, butyl acetate, or toluene, in order to ensure a sufficiently low viscosity of the reaction mixture.

However, polymerization without any solvent(s) is particularly preferred.

ADVANTAGEOUS EFFECTS OF THE INVENTION

The process of the invention makes it possible to prepare polymethacrylate molding compounds having high heat deflection temperatures, preferably heat deflection temperatures of more than 110° C., measured as Vicat softening temperature according to DIN 53 460. It is particularly preferred that polymethacrylate molding compounds be obtained which have Vicat softening temperatures in excess of 112° C. Another advantage of the polymethacrylate molding compounds produced in the invented process is the low isotactic triad content in the polymethacrylate polymer chain (tacticity however can only be determined for very low comonomer amounts in addition to the methacrylate monomer), which in addition to a low residual monomer content in the polymer also contributes to the high heat deflection temperature of the molding compounds.

The high thermal stability of the polymethacrylate molding compounds prevents thermal degradation of the molding compounds during thermoplastic processing, and thus an increase in the residual monomer content, which again would result in a reduction of the heat deflection temperature.

The process for producing polymethacrylate molding compounds can be performed without technical problems, e.g. by using the stirred tank technology that very accurately defines the reaction conditions, such as dwelling time, reactor temperature, or degree of conversion. The unreacted monomers can be separated easily from the molding compound polymer, e.g. by vacuum distillation, and can be re-polymerized, in general by adding polymerization aids and possibly additional monomer amounts.

Having generally described this invention, a further understanding can be obtained by reference to certain specific examples which are provided herein for purposes of illustration only and are not intended to be limiting unless otherwise specified.

EXAMPLES

EXAMPLE 1

Into a glass stirred tank reactor with blade agitator and a reactor content of 1,500 $cm^3$, 600 g of methylmethacrylate is placed and heated to 90° C. Then 2.7 g of dodecylmercaptan is added with stirring. To prevent oxygen inhibition of the polymerization, the air is expelled from the stirred tank reactor with argon. A mixture of 9.928 g of methylmethacrylate and 0.072 g of 2,2'-azobisisobutyronitrile is added continuously drop by drop over 3.5 hours at a constant polymerization temperature of 95° C.

The monomer conversion is 54%. The obtained syrup can be easily stirred at 95° C., whereby the syrup is diluted for further handling at room temperature and for stabilization against further polymerization with 200 g butyl acetate and 0.06 g of 4-hydroxy-2,2,6,6-tetramethylpiperidinooxyl.

Characterization of the obtained polymer is performed by gel permeation chromatography (cf. e.g. H. F. Mark et al., Encyclopedia of Polymer Science & Engineering, 2nd ed., Vol. 10, pp. 1 to 19, J. Wiley, New York, 1987).

This results in the following molecular weights:

Weight average $M_w$=106,000 Dalton

Number average $M_n$=56,200 Dalton

Non-Uniformity $U=M_w/M_n-1=0.89$

EXAMPLE 2

Polymerization is performed as described in Example 1. The reaction temperature is 85° C., and a mixture of 10 g methylmethacrylate and 70 ppm 2,2'-azobisisobutyronitrile is added drop by drop for 6 hours.

The monomer conversion is 45%.

This results in the following molecular weights:

Weight average $M_w$=115,000 Dalton

Number average $M_n$=65,000 Dalton

Non-Uniformity $U=M_w/M_n-1=0.75$

EXAMPLE 3

The charge described in Example 2 is doubled in volume and is polymerized under the reaction conditions cited in Example 2.

The monomer conversion is 44%.

This results in the following molecular weights:

Weight average $M_w$=115,000 Dalton

Number average $M_n$=59,300 Dalton

Non-Uniformity $U=M_w/M_n-1=0.94$

EXAMPLE 4

Isolation of the polymethylmethacrylate molding compound. The charges according to Examples 1 to 3 are combined and degasified at 250° C. and at a pressure of $5\times10^3$ Pa in the last degasification zone of a single-screw extruder. Throughput is chosen so that 440 g of molding compound granules are obtained per hour. The granulate of the polymethylmethacrylate molding compound is glass-clear and has a solution viscosity in chloroform according to DIN 53 018 of 52.3 $cm^3g^{-1}$.

At 190° C. and 150 bar an extruded plate is produced from this granulate. After the extrusion process, the solution viscosity of the molding compound in chloroform is 53.0 $cm^3g^{-1}$. A Vicat softening point according to DIN 53 460 for the molding compound is VST-B=118° C.

EXAMPLE 5

Into a 100 l VA-polymerization reactor with blade agitator, 40 kg of methylmethacrylate are placed under argon as a protective gas and are heated with stirring to 90° C. A 180 g amount of dodecylmercaptan are added to the methylmethacrylate that was heated to 90° C., and the polymerization is initiated by adding 200 g of an 0.4% solution of 2,2'-azobisisobutyronitrile in methylmethacrylate. The internal temperature of the reactor is kept constant by cooling the reactor jacket to 90° C. to 91° C.

Each 40, 80, 120, and 160 minutes from the start of polymerization, another 100 g of an 0.4% solution of 2,2'-azobisisobutyronitrile in methylmethacrylate are added respectively. One hundred minutes after the last initiator addition, the reaction is terminated by adding 4 g of 4-hydroxy- 2,2,6,6-tetramethylpiperidino-1-oxyl. Cooling to room temperature follows. This results in a clear, colorless polymer solution with a solids content of 38.7%.

Molecular weights and tacticity of the polymerization solid are determined. The tacticity is determined with $^{13}$C-NMR (regarding tacticity of PMMA see e.g. Vieweg, Esser, Kunststoff-Handbuch, Vol. IX, pp. 28,29, Carl Hanser Verlag, Munich, 1975). Tacticity: 3.5% isotactic, 36.5% heterotactic, 60% syndiotactic triads.

MGV-GPC: $M_w=1.07\times10^5$, $M_n=5.94\times10^4$, $U=0.8$.

The obtained syrup is degasified at 250° C. (extruder cylinder temperature) with a throughput of 4.9 kg/h. This results in a clear, almost colorless granulate, whereby the solvent viscosity of the granulated polymer in chloroform according to DIN 53 018 is 50.0 $cm^3g -1$.

The granulate obtained in this manner is used to produce test samples by injection molding. At a processing temperature of 250° C. this results in a test sample with a Vicat softening temperature according to DIN 53 460 [VST (B50)] of 114° C. Even when injection molding under more extreme conditions (270° C.), a VST (B50) of 114° C. is still found. The residual monomer content in the test samples, both those produced at 250° C. and those at 270° C., is <0.4%.

This means that the PMMA molding compound according to Example 5 results not only in a molding compound with a particularly high heat deflection temperature; but the processing stability of the PMMA polymer produced according to the invention is also very high.

Having now fully described the invention, it will be apparent to one of ordinary skill in the art that many changes and modifications can be made thereto without departing from the spirit or scope of the invention as set forth herein.

What is claimed as new and desired to be secured by Letters Patent of the United States is:

1. A process for the production of polymethacrylate molding compounds having improved heat deflection temperature and stability against thermal degradation, which comprises polymerizing methacrylate monomers in the presence of a polymerization initiator in a reaction mixture in reactors in which substantial intermixing is ensured, and then removing the unreacted monomers from the reaction mixture, wherein said polymerization is effected such that at least 70 wt. % of the polymethacrylate molding compound is produced at a methacrylate monomer concentration of more than 5 mol/liter.

2. The process as claimed in claim 1, wherein the polymerization temperature is between 30° and 120° C.

3. The process as claimed in claim 1 or 2, wherein the content of the polymerization initiator in the reaction mixture is less than 0.05 wt. %.

4. The process as claimed in claim 1 or 2, wherein polymerization is effected using a molecular weight regulator of between 0.1 and 2 wt. %.

5. The process of claim 4, wherein said molecular weight regulator is a mercaptan.

6. The process as claimed in claim 1 or 2, wherein the polymethacrylate molding compounds contain more than 75 wt. % methylmethacrylate as the monomer incorporated in the polymer by polymerization.

7. The process as claimed in claim 1, wherein the polymerization process is performed discontinuously.

8. The process as claimed in claim 1, wherein remaining unreacted monomer is separated by vacuum degasification in a separate process step.

9. The process as claimed in claim 1, wherein the separated, unreacted monomer is returned to the reaction mixture for further reaction.

10. The process as claimed in claim 1, wherein polymerization inhibitors in amounts from $10^{-4}$ to 1 wt. % based on the reaction mixture are added to the reaction mixture in order to terminate the polymerization.

11. The process as claimed in claim 1, wherein said polymethacrylate molding compounds have a heat deflection temperature of more than 110° C.

12. The process as claimed in claim 11, wherein said polymethacrylate molding compounds have a heat deflection temperature of more than 112° C.

13. The process as claimed in claim 1, wherein said reactors; are discontinuous and are equipped with blade, anchor, disk or impeller agitators, thereby ensuring said substantial mixing.

14. The process as claimed in claim 1, wherein said reactors are continuous and are equipped with screw conveyer aggregates.

* * * * *